United States Patent
Frolov et al.

(10) Patent No.: US 9,631,965 B2
(45) Date of Patent: Apr. 25, 2017

(54) OFFSET COMPENSATION FOR FLOW SENSING DEVICES

(71) Applicant: SENSORTECHNICS GMBH, Puchheim (DE)

(72) Inventors: Gennadiy Frolov, Montreal (CA); Oleg Grudin, Montreal (CA)

(73) Assignee: SENSORTECHNICS GMBH, Puchheim (DE)

( * ) Notice: Subject to any disclaimer, the term of this patent is extended or adjusted under 35 U.S.C. 154(b) by 1109 days.

(21) Appl. No.: 13/766,288

(22) Filed: Feb. 13, 2013

(65) Prior Publication Data

US 2013/0211767 A1    Aug. 15, 2013

Related U.S. Application Data

(60) Provisional application No. 61/598,944, filed on Feb. 15, 2012.

(51) Int. Cl.
  *G01F 1/698*  (2006.01)
  *G01F 1/696*  (2006.01)

(52) U.S. Cl.
  CPC .............. *G01F 1/698* (2013.01); *G01F 1/696* (2013.01)

(58) Field of Classification Search
  CPC ........................................ G01F 1/698
  USPC ........................................ 702/100
  See application file for complete search history.

(56) References Cited

U.S. PATENT DOCUMENTS

| | | | | |
|---|---|---|---|---|
| 3,603,147 | A * | 9/1971 | Dorman | G01P 5/12 73/170.12 |
| 4,587,842 | A * | 5/1986 | Handtmann | F02D 41/187 73/204.14 |
| 5,076,099 | A | 12/1991 | Hisanaga et al. | |
| 5,177,696 | A * | 1/1993 | Bonne | G01N 25/005 374/44 |
| 7,284,424 | B2 * | 10/2007 | Kanke | G01F 1/6845 73/204.15 |
| 7,712,347 | B2 | 5/2010 | Ricks et al. | |
| 2006/0090573 | A1 * | 5/2006 | Foss | G01F 1/684 73/861.85 |
| 2007/0109091 | A1 * | 5/2007 | Landsberger | G01N 27/14 338/25 |
| 2009/0133490 | A1 * | 5/2009 | Zschernack | A61B 5/0878 73/204.27 |
| 2009/0164163 | A1 * | 6/2009 | Wang | G01F 1/6845 702/100 |

* cited by examiner

*Primary Examiner* — Ricky Ngon
(74) *Attorney, Agent, or Firm* — Norton Rose Fulbright Canada LLP

(57) ABSTRACT

There is described herein a flow sensing device having offset compensation and an offset compensation method, the flow sensing device having two separate and independent thermal flow sensors, each containing a heater and at least one temperature-sensitive element. The components of the two thermal flow sensors are connected such that flow-dependent contributions of each sensor into a common output signal have opposite signs after passing through a subtracting node. Heating pulses are applied to the heaters of the two thermal flow sensors out of phase, and an output signal is measured for each heat pulse applied. A net output signal is then determined by calculating a difference between a last output reading and at least one previous output reading.

16 Claims, 6 Drawing Sheets

OFFSET COMPENSATION FOR FLOW SENSING DEVICES

CROSS-REFERENCE TO RELATED APPLICATIONS

This application claims priority under 35 U.S.C. §119(e) from U.S. Provisional Patent Application No. 61/598,944, filed on Feb. 15, 2012, the contents of which are hereby incorporated by reference.

TECHNICAL HELD

The present invention relates to the field of thermal anemometers and more particularly, thermal anemometers used for micro airflow sensing.

BACKGROUND OF THE ART

A thermal anemometer measures fluid velocity using heat transfer phenomena. Thermal anemometer micro-flow sensors typically contain identical upstream and downstream temperature-sensitive elements and a heater located between them. The layout of such a sensor is usually symmetrical, including spatial positioning of all functional elements and distribution of their electrical parameters. In theory, this symmetry provides zero offset of the sensor and a symmetrical response on bidirectional input signals. However in practice, variations in physical parameters inevitably occur during the manufacturing process and cause non-zero offsets of the sensor. This offset as well as temperature drifts and long-term drift caused by temperature and time instability of the materials of the sensor may seriously affect the accuracy of measurements taken using the flow sensing devices. Non-zero offsets must be compensated in the majority of applications to provide a required level of sensor accuracy.

SUMMARY

There is described herein a flow sensing device having offset compensation and an offset compensation method, the flow sensing device having two separate and independent thermal flow sensors, each containing a heater and at least one temperature-sensitive element. The components of the two thermal flow sensors are connected such that flow-dependent contributions of each sensor into a common output signal have opposite signs after passing through a subtracting node. Heating pulses are applied to the hearers of the two thermal flow sensors out of phase, and an output signal is measured for each heat pulse applied. A net output signal is then determined by calculating a difference between a last output reading and at least one previous output reading.

In accordance with a first broad aspect, there is provided a method of offset compensation for a flow sensing device having a first thermal flow sensor with a first heater and at least a first temperature sensitive element and a second thermal flow sensor with a second heater and at least a second temperature sensitive element, the first thermal flow sensor and the second thermal flow sensor being separate and independent, measuring a same flow, and generating flow-dependent signals. The method comprises applying hearing pulses (i) to the first heater and the second heater alternatingly such that when the first heater is turned on, the second heater is turned off and when the second heater is turned on, the first heater is turned off. An output signal $V_{out}$ is formed from the flow-dependent signals such that contributions of the flow-dependent signals have opposite signs of sensitivity to flow. The output signal $V_{out}$ of the flow sensing device is measured and stored at each one of the heating pulses (i), and a net output signal $V_{net}$ is determined by subtracting at least one previous output signal reading $V_{out}(i-1)$ from a last output signal reading $V_{out}(i)$.

In accordance with a second broad aspect, there is provided a flow sensing device having a compensated offset. The device comprises a circuit having a first thermal flow sensor with a first heater and at least a first temperature sensitive element and a second thermal flow sensor with a second heater and at least a second temperature sensitive element, the first thermal flow sensor and the second thermal flow sensor being separate and independent, measuring a same flow, and generating flow-dependent signals of opposite signs that combine to form an output signal $V_{out}$. A heating module is connected to an input of the circuit and configured to apply heating pulses (i) to the first heater and the second heater alternatingly such that when the first heater is turned on, the second heater is turned off and when the second heater is turned on, the first heater is turned off. An output module is connected to an output of the circuit for measuring and storing the output signal $V_{out}$ at each heating pulse (i) and determining a net output signal $V_{net}$ by subtracting at least one previous output signal reading $V_{out}(i-1)$ from a last output signal reading $V_{out}(i)$.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference characters.

DETAILED DESCRIPTION

Figure 1:
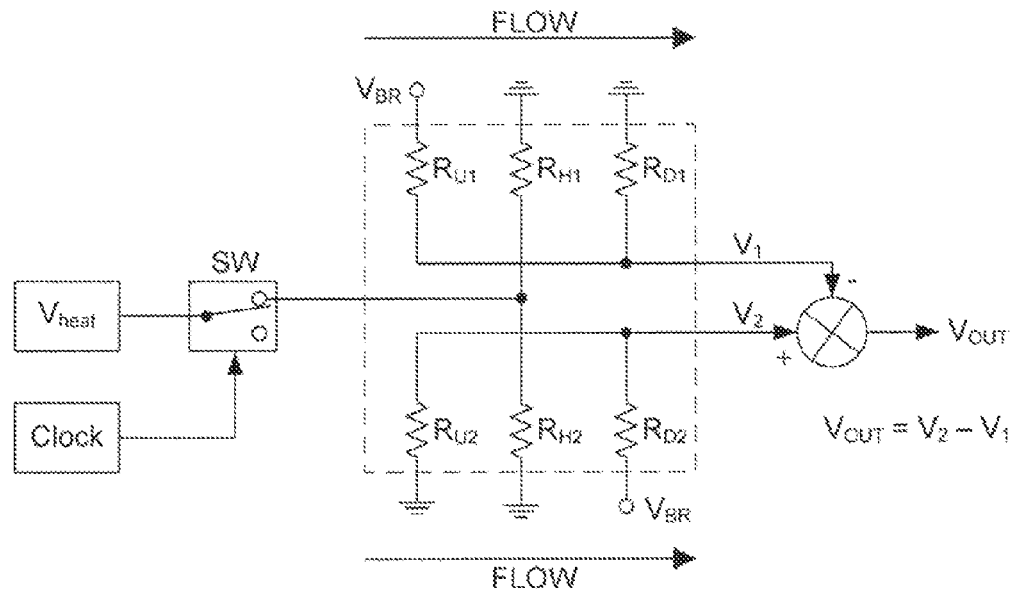
FIG. 1 is a circuit diagram showing an exemplary embodiment of an offset canceling circuit with two heaters switching on and off synchronously, as per the prior art.

Referring to FIG. 1, there is illustrated a Micro-Electro-Mechanical System (MEMS) micro-flow sensor. This sensor has two identical heating elements (heaters) $R_{H1}$, $R_{H2}$ and two pairs of identical upstream and downstream temperature-sensitive elements $R_{U1}$, $R_{D1}$ and $R_{U2}$, $R_{D2}$ located on opposite sides of each heater and placed on a thin dielectric bridge suspended over the channel in a silicon substrate that provides high thermal isolation from a bulk substrate. The thermal sensors $R_{U1}$, $R_{D1}$ and $R_{U2}$, $R_{D2}$ are configured in a Wheatstone bridge while the heaters $R_{H1}$ and $R_{H2}$ are supplied by a heating current from a source of heating voltage $V_{heat}$.

The half-bridge thermal sensor elements $R_{H1}$, $R_{U1}$, $R_{D1}$ are thermally isolated from the half-bridge sensor elements $R_{H2}$, $R_{U2}$, $R_{D2}$. This means that a temperature change of the heater $R_{H1}$ does not affect a signal from the second half-bridge sensor, and a temperature change of the heater $R_{H2}$ does not affect a signal from the first half-bridge sensor. In a micro-flow sensor thus constructed, a temperature of the upstream and downstream thermal sensors depends on the heater temperature and the flow rate of a fluid of interest. For example, an increase in flow rate leads to an increase in temperature of the downstream thermal sensor and to a decrease in temperature of the upstream thermal sensor, thus changing their resistance and providing an output signal $V_{out}$ dependent on flow rate.

A switch SW governed by a clock generator controls an ON/OFF condition of heaters $R_{H1}$, $R_{H2}$. When the switch SW is on, power is supplied from a voltage source $V_{heat}$, or from an optional digital-to-analog converter (DAC), to the heaters $R_{H1}$, $R_{H2}$, and output signal $V_{out1}=S_2-S_1+O_2-O_1$ is generated, where $S_1$, $S_2$ are flow-dependent signals from the first and the second half-bridge sensors respectively; and $O_1$, $O_2$ are offsets from the first and the second half-bridge sensors respectively. In case of ideal symmetry of all four thermal sensors, $O_1=O_2=V_{br}/2$, where $V_{br}$ is the bridge excitation voltage.

When the switch SW is off, the output signal is $V_{out2}=O_2-O_1$. A net output signal $V_{net}$ is defined as a difference between $V_{out1}$ and $V_{out2}$:

$$V_{net}=V_{out1}-V_{out2}=(S_2-S_1)+(O_2-O_1)-(O_2-O_1)=S_2-S_1 \quad (1)$$

where $S_2 \approx -S_1$ and therefore $V_{net} \approx 2 S_2 \approx -2 S_1$

A limitation of the micro-flow sensor circuit shown in FIG. 1 is that when the two heaters are off, sensitivity of the sensor drops and tracking of the input signal is lost. This period of time is totally dedicated to offset measurement which can be either repeated automatically before each flow measurement or performed by a user at certain predetermined moments during operation of the system.

Figure 2:
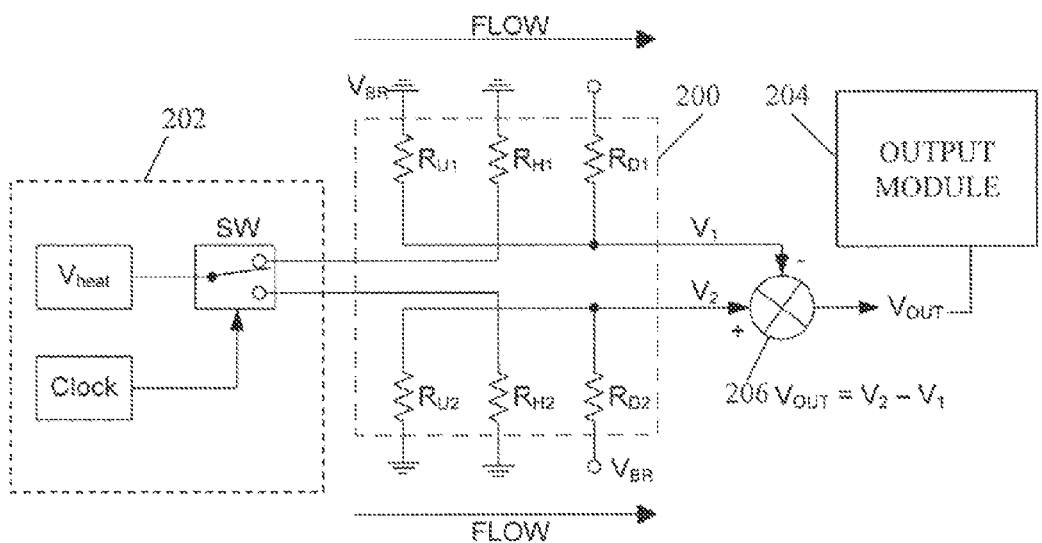
FIG. 2 is a circuit diagram showing an exemplary embodiment of an offset canceling circuit with the heaters powered out-of-phase.

To overcome this limitation, an alternative embodiment is illustrated in FIG. 2. As shown, a circuit 200 has heaters $R_{H1}$ and $R_{H2}$ individually accessible and powered out-of-phase such that one of the heaters is always on. In addition to this, connection of the temperature-sensitive elements in the first half-bridge thermal sensor is modified, compared to the configuration of FIG. 1, such that resistor $R_{D1}$ is connected to the bridge excitation voltage $V_{BR}$ and resistor $R_{U1}$ is connected to ground. Such a connection of the four temperature-sensitive elements gives a zero flow sensitivity when both heaters are turned on because the flow-dependent signals from the two half-bridge thermal flow sensors have the same sign and are subtracted by a subtracting node 206, which may be provided inside circuit 200 or externally therefrom. With this configuration, the contributions of flow-dependent signals from the two half-bridge sensors into an output signal after passing through the subtracting node 206 are $S_2$ and $-S_1$, thereby having opposite signs of sensitivity to flow. A heating module 202 applies the out-of-phase heating pulses to the circuit and an output module 204 measures and stores the output $V_{out}$.

The output of the micro-flow sensor $V_{net}$ with canceled offset can be found by the output module 204 as a difference between a last output reading and previous output readings according to the specifications of Table 1 below and equation 2. A sensor output measured with the heater $R_{H1}$ off is subtracted from an output measured with the heater $R_{H2}$ on.

TABLE 1

Figure 3A:
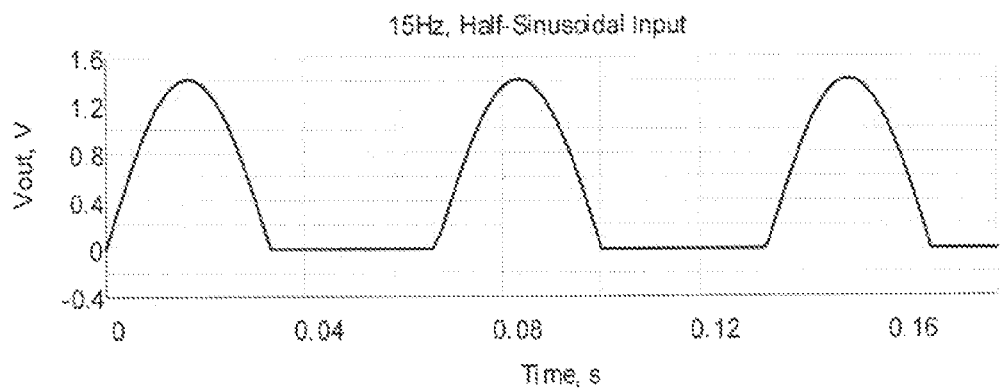
FIGS. 3a, 3b, and 3c are graphs representing output signals from micro-flow sensors according to the circuit diagrams shown in FIGS. 1 and 2.
Figure 3B:
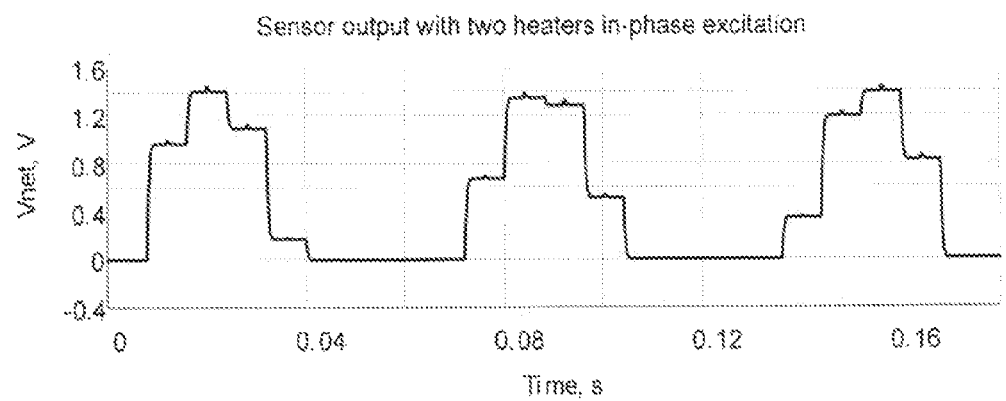
Figure 3C:
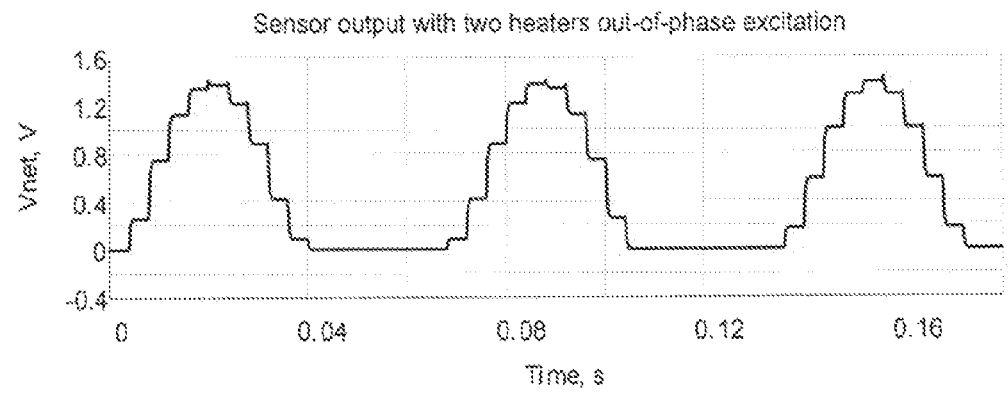

| Heaters | $V_1$ | $V_2$ | $V_{out1}$, $V_{out2}$ |
|---|---|---|---|
| 1  $R_{H1}$ = OFF, $R_{H2}$ = ON | $O_1$ | $S_2 + O_2$ | $V_{out1} = V_2 - V_1 = S_2 + O_2 - O_1$ |
| 2  $R_{H1}$ = ON, $R_{H2}$ = OFF | $S_1 + O_1$ | $O_2$ | $V_{out2} = V_2 - V_1 = O_2 - S_1 - O_1$ |

$$V_{net}=V_{out1}-V_{out2}=(S_2+O_2-O_1)-(O_2-S_1-O_1)=S_2+S_1, \quad (2)$$

where:
$S_1$ is a signal from the first half-bridge micro flow sensor $R_{U1}$, $R_{D1}$;
$S_2$ is a signal from the second half-bridge micro flow sensor $R_{U2}$, $R_{D2}$;
$O_1$ is an offset from the first half-bridge micro flow sensor $R_{U1}$, $R_{D1}$;
$O_2$ is an offset from the second half-bridge micro flow sensor $R_{U2}$, $R_{D2}$;
$S_2 \approx S_1$ and therefore $V_{net} \approx 2 S_2 \approx 2 S_1$ FIGS. 3b and 3c illustrate the result of a simulation of the response of the sensors for a 15 Hz half-sinusoidal input signal, shown on FIG. 3a, where measurements of the input signal are done with 5 ms intervals. FIG. 3b shows a response of the sensor with in-phase switching of the heaters, as per the embodiment of FIG. 1. Each second measurement of the sensor is done with the heaters off for the offset measurement, and the flow-dependent signal is then subtracted. FIG. 3c shows a response of the sensor with out-of-phase switching of the heaters, as per the embodiment of FIG. 2. The sensor with out-of-phase switching of the heaters demonstrates a more accurate tracing of a time-varying signal.

Figure 4A:
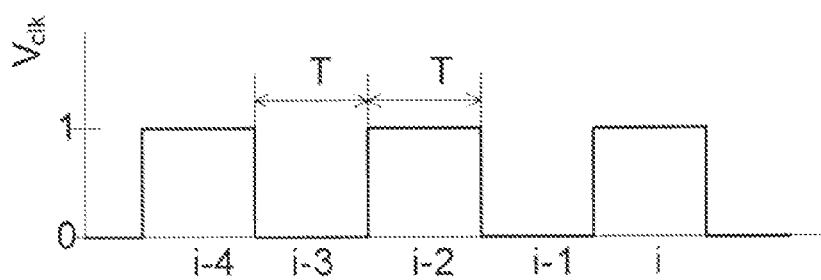
FIGS. 4a, 4b, and 4c show exemplary waveforms from a clock generator corresponding to heating pulses applied to the heaters.
Figure 4B:
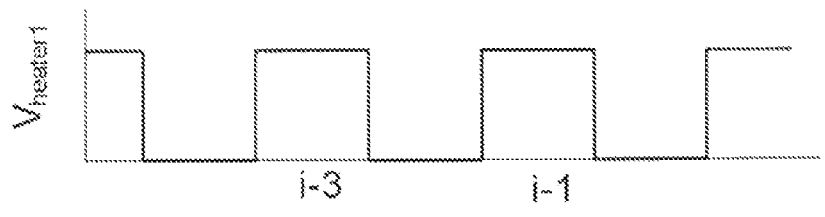
Figure 4C:
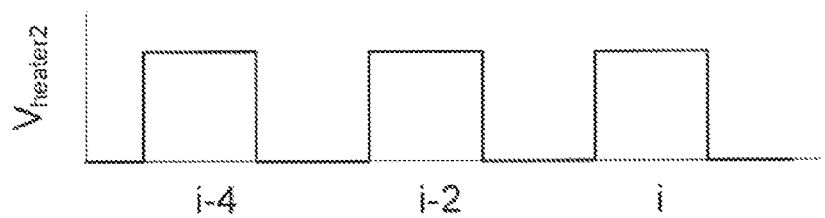

Referring back to the circuit of FIG. 2, there is illustrated a clock generator used to turn the switch on and off to apply an excitation voltage $V_{heat1}$ and $V_{heat2}$ either to the heater $R_{H1}$ or to heater $R_{H2}$. Examples of the clock signal and the two excitation voltages are shown in FIGS. 4a, 4b, and 4c, respectively. When a logic output of the generator $V_{clk}(i)=1$, heater $R_{H2}$ is on and heater $R_{H1}$ is off. When $V_{clk}(i)=0$, heater $R_{H1}$ is on and heater $R_{H2}$ is off. Output values $V_{out}(i)$ of the sensor are measured with a time interval T for each heating pulse i and stored. This offset compensation method is based on a subtraction of the last two measured values $V_{out}(i)$ and $V_{out}(i-1)$, as per equation (2), that can be presented mathematically as:

$$V_{net}(i)=(V_{out}(i)-V_{out}(i-1))(2V_{clk}(i)-1), \quad (3)$$

where the function $2V_{clk}(i)-1$ equals 1, when $V_{clk}(i)=1$ or −1, when $V_{clk}(i)=0$.

Compare measurements of the flow sensors with different powering modes of the heaters. When both heaters of the sensor shown in FIG. 1 are permanently on, the sensor operates in a traditional DC mode without any offset compensation and with certain nominal sensitivity. When operating in DC mode, the sensor provides ideal tracking of the signal. This sensor can also operate in a mode with in-phase heaters switching.

The sensor shown in FIG. 2 has zero sensitivity when both heaters are on because of the subtraction of signals $V_2$ and $V_1$ from two substantially identical half-bridges performed by the subtracting node. If only one of two substantially identical heaters is on, a sensitivity of the sensor reaches approximately 50% of the sensitivity of the sensor from FIG.

1. Therefore each measured value $V_{out}(i)$ contains a sensor offset component and a component dependent on flow registered with a reduced sensitivity. Subtraction of two subsequent measured values $V_{out}(i)$ and $V_{out}(i-1)$ (as per equation (3)) every T milliseconds cancels the offset and effectively restores sensitivity to the level of the sensor from FIG. 1. An update of the sensor output due to input signal changes is performed with time intervals T when either heater $R_{H1}$ or heater $R_{H2}$ is turned on.

Figures 5A, 5B, 5C, 5D:
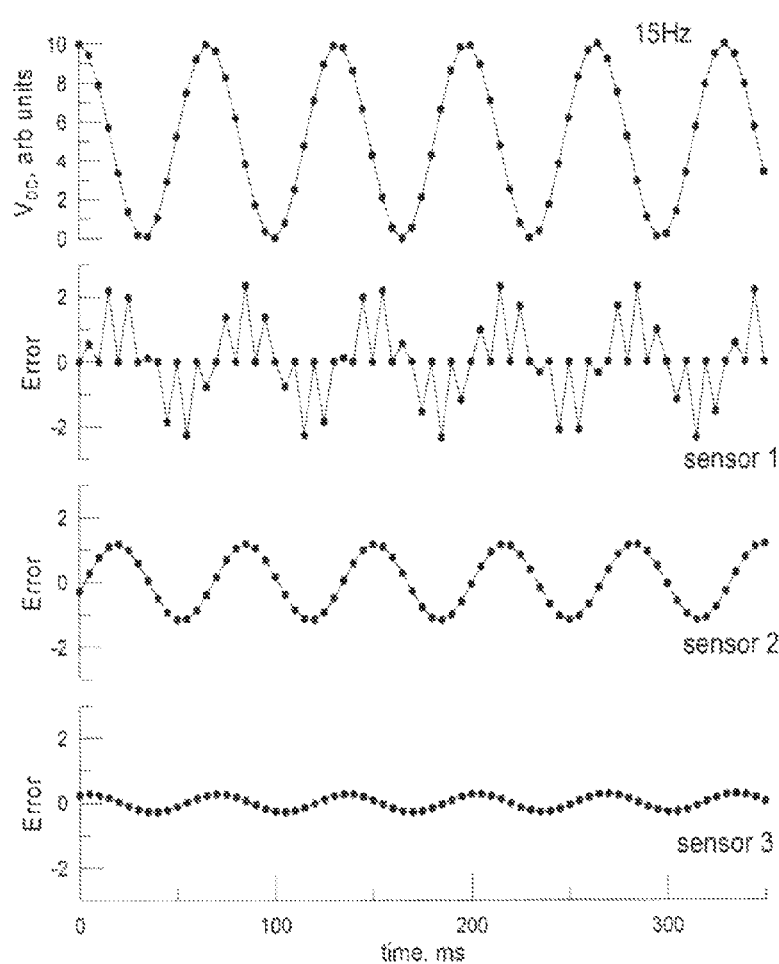
FIGS. 5a, 5b, 5c, and 5d show exemplary measurement errors of the flow sensing device using different offset compensation algorithms for 15 Hz sinusoidal signals.
Figures 6A, 6B, 6C, 6D:
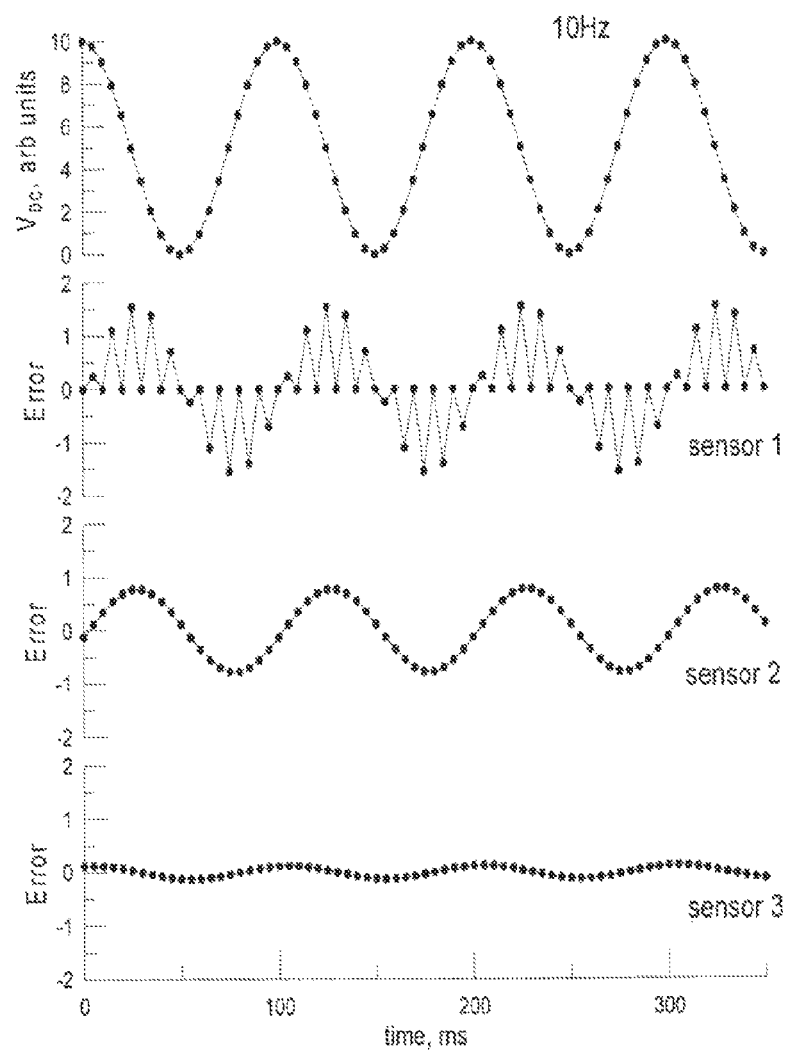
FIGS. 6a, 6b, 6c, and 6d show exemplary measurement errors of the flow sensing device using different offset compensation algorithms for 10 Hz sinusoidal signals.

The results of the simulation of measurement accuracy are presented in FIGS. 5a-5d and 6a-6d. The solid circles in FIGS. 5a and 6a represent measured values of the output signal $V_{DC}$ of the sensor with the heaters permanently on (as per FIG. 1). Measurements are done with an interval T=5 ms for 15 Hz and 10 Hz sinusoidal signals, respectively. Deviations of the outputs from $V_{DC}$ for sensor 1 (in-phase heaters switching; circuit of FIG. 1) and sensor 2 (out-of-phase heaters switching; circuit of FIG. 2) are shown on FIGS. 5b, 5c (15 Hz) and 6b, 6c (10 Hz). The embodiment of FIG. 2 demonstrates a lower error of measurement than the embodiment of FIG. 1.

The accuracy of measurements with the use of the proposed technique can be further improved if more than the two last stored measurements $V_{out}(i)$ are used in determining the sensor net output signal, as per another embodiment. Equation (4) is a mathematical representation of the sensor output determined from the three last measurements $V_{out}(i)$, $V_{out}(i-1)$ and $V_{out}(i-2)$:

$$V_{net2}=((1+k)V_{out}(i)-V_{out}(i-1)-kV_{out}(i-2))(2V_{clk}(i)-1), \quad (4)$$

where an adjusting coefficient k varies from 0 to 1.

FIGS. 5d and 6d show deviations of the output of the sensor of FIG. 2 based on equation (4) with a coefficient k=0.5 from $V_{DC}$ values. Coefficient k is used to minimize a time delay between an ideal signal response of the sensor operating in DC mode and a response of the sensor implementing out-of-phase switching of the heaters. In some embodiments, the values of coefficient k range from 0 to 1.

Figures 7A, 7B:
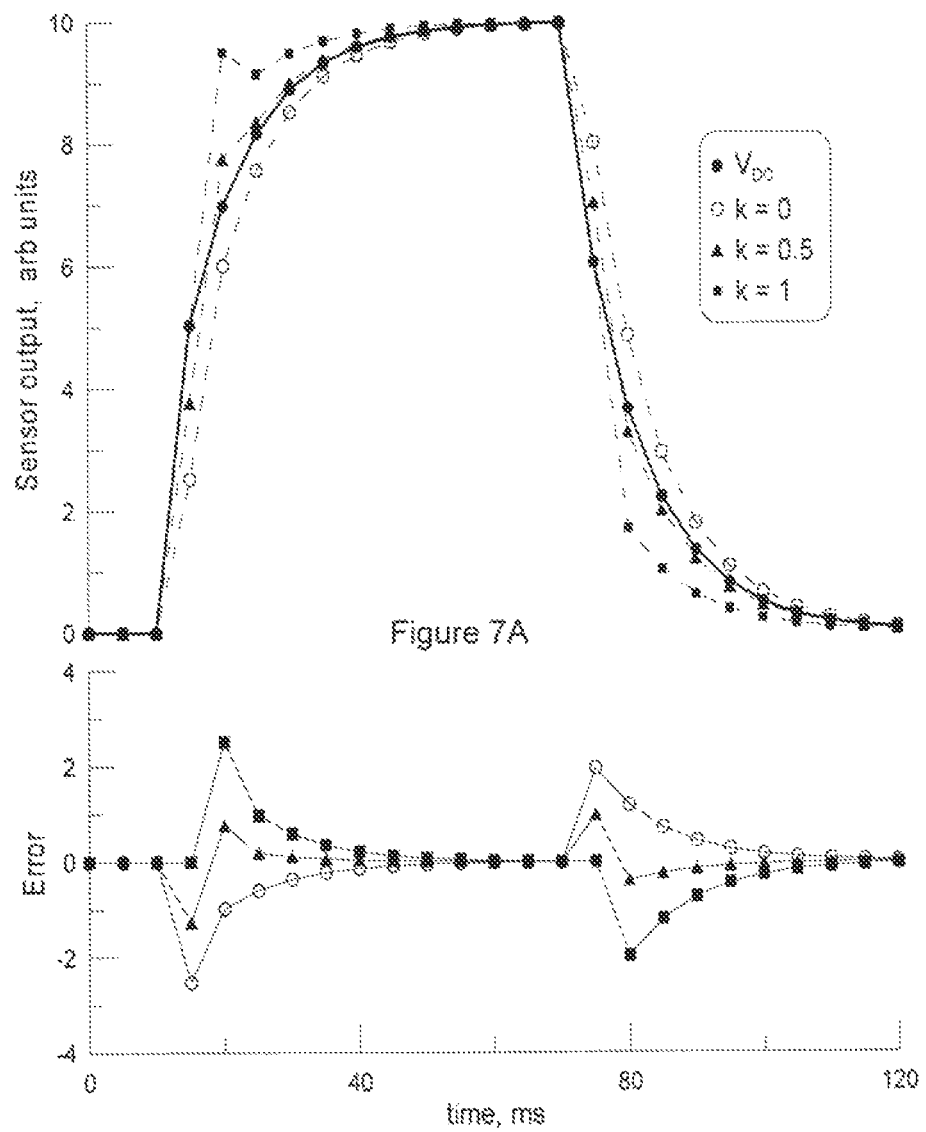
FIGS. 7a and 7b show an exemplary response of the flow sensing device and error of measurements for a 60 ms pulse signal with a 10 ms rise and fall time.

To understand the influence of k, consider a response of the sensor for a 60 ms pulse with rise and fall time τ=10 ms. FIG. 7a shows a simulated response $V_{DC}$ of the sensor circuit of FIG. 1 with both heaters permanently on (solid circles) compared to the simulated response of the sensor with signal processing based on equation (4) with different coefficients k. Note that at k=0, equation (4) coincides with equation (3). FIG. 7b shows deviations of the readings of the sensor from the output of the sensor operating with both heaters on at k=0; 0.5; 1, using an algorithm based on equation (4). A minimal error is reached at k=0.5. The condition k=1 results in signal overregulation with an associated decrease of sensor accuracy.

While the presently described micro-flow sensor for implementing the offset compensation method includes two identical half-bridge thermal sensors with separate heaters, it should be understood that in general the method of offset compensation can be applied to any pair of identical thermal anemometer-type sensors of different designs measuring the same flow. In addition, only one temperature sensitive element may be used instead of two for each sensor of the pair of substantially identical sensor.

The heaters and temperature-sensitive elements may be, for example, poly-silicon resistors fabricated in a standard CMOS process. They may have different doping providing an optimal resistance value and TCR (temperature coefficient of resistance) for these different functional elements.

The optimal width of heater excitation pulses T can be determined by those skilled in the art. Time T may be several times longer than a typical thermal response time for the thermal anemometer-type sensor to allow the output signal to reach its stable value during the process of heating or cooling of the temperature-sensitive elements. Response times, as defined by geometry, thermal mass and thermal conductivity of the sensor micro-structure, are typically about 1-2 ms for thermal anemometers manufactured in known MEMS processes. Therefore, a sampling interval T of about 4-5 ms and longer may be used for the described offset compensation method.

The method of offset compensation may be used to cancel not only static long-term drift and temperature drift of offset, but also short-term variations of offset. With a sampling interval of 5 ms, offset variations with a frequency below 50 Hz can be effectively canceled. This reduces sensor low frequency noise and improves its signal-to-noise ratio.

It should be noted that the present invention can be carried out as a method and can be embodied in a system. The embodiments of the invention described above are intended to be exemplary only. The scope of the invention is therefore intended to be limited solely by the scope of the appended claims.

The invention claimed is:

1. A method of offset compensation for a flow sensing device, the method comprising:
applying heating pulses (i) to a first heater and a second heater in the flow sensing device alternatingly such that when the first heater is turned on, the second heater is turned off and when the second heater is turned on, the first heater is turned off, the flow sensing device having a first thermal flow sensor with the first heater and at least a first temperature sensitive element and a second thermal flow sensor with the second heater and at least a second temperature sensitive element, the first thermal flow sensor and the second thermal flow sensor being separate and thermally isolated, measuring a same flow, and generating flow-dependent signals;
forming an output signal $V_{out}$ from the flow-dependent signals such that contributions of the flow-dependent signals have opposite signs of sensitivity to flow;
measuring and storing the output signal $V_{out}$ of the flow sensing device at each one of the heating pulses (i); and
determining a net output signal $V_{net}$ by subtracting at least one previous output signal reading $V_{out}(i-1)$ from a last output signal reading $V_{out}(i)$.

2. The method of claim 1 wherein determining the net output signal $V_{net}$ comprises taking into account a coefficient k that minimizes a time delay between an ideal signal response of the flow sensing device operating in DC mode and a response of the flow sensing device implementing out-of-phase switching of the first heater and the second heater.

3. The method of claim 2, wherein coefficient k is defined as 0≤k≤1.

4. The method of claim 2, wherein coefficient k=0.5.

5. The method of claim 1, wherein determining the net output signal $V_{net}$ comprises determining the net output signal $V_{net}$ from three last measurements $V_{out}(i)$, $V_{out}(i-1)$ and $V_{out}(i-2)$.

6. The method of claim 1, wherein measuring and storing the output signal $V_{out}$ comprises performing a measurement with a sampling interval of at least about ms.

7. The method of claim 1, wherein forming an output signal $V_{out}$ comprises inverting and adding signals from the first thermal flow sensor and the second thermal flow sensor and generating the output signal $V_{out}$.

8. A flow sensing device having a compensated offset, the device comprising:
- a circuit having a first thermal flow sensor with a first heater and at least a first temperature sensitive element and a second thermal flow sensor with a second heater and at least a second temperature sensitive element, the first thermal flow sensor and the second thermal flow sensor being separate and thermally isolated, measuring a same flow, and generating flow-dependent signals of opposite signs that combine to form an output signal $V_{out}$;
- a heating module connected to an input of the circuit and configured to apply heating pulses (i) to the first heater and the second heater alternatingly such that when the first heater is turned on, the second heater is turned off and when the second heater is turned on, the first heater is turned off;
- an output module connected to an output of the circuit for measuring and storing the output signal $V_{out}$ at each heating pulse (i) and determining a net output signal $V_{net}$ by subtracting at least one previous output signal reading $V_{out}(i-1)$ from a last output signal reading $V_{out}(i)$.

9. The flow sensing device of claim 8, wherein the output module calculates the net output signal $V_{net}$ by taking into account a coefficient k that minimizes a time delay between an ideal signal response of the flow sensing device operating in DC mode and a response of the flow sensing device implementing out-of-phase switching of the first heater and the second heater.

10. The flow sensing device of claim 9, wherein the coefficient k is defined as $0 \leq k \leq 1$.

11. The flow sensing device of claim 9, wherein coefficient k=0.5.

12. The flow sensing device of claim 8, wherein the output module determines the net output signal $V_{net}$ using three last measurements $V_{out}(i)$, $V_{out}(i-1)$ and $V_{out}(i-2)$.

13. The flow sensing device of anyone of claim 8, wherein the first thermal flow sensor and the second thermal flow sensor each comprise two temperature sensitive elements and the first and second heaters are placed in between the two temperature sensitive elements.

14. The flow sensing device of claim 13, wherein the temperature-sensitive elements are thermoresistors.

15. The flow sensing device of claim 14, wherein two thermoresistors from the first thermal flow sensor and two thermoresistors from the second thermal flow sensor form a Wheatstone bridge by having:
- a set of first terminals of downstream thermoresistors from the first thermal flow sensor and the second thermal flow sensor connected to a top of the Wheatstone bridge;
- a set of first terminals of upstream thermoresistors from the first thermal flow sensor and the second thermal flow sensor connected to a bottom of the Wheatstone bridge; and
- a set of second terminals of the upstream and downstream thermoresistors belonging to a same thermal flow sensor connected together, with two connecting points forming a diagonal of the Wheatstone bridge.

16. The flow sensing device of claim 8, wherein the circuit comprises a subtracting node for inverting and adding signals from the first thermal flow sensor and the second thermal flow sensor and generating the output signal $V_{out}$.

* * * * *